(12) United States Patent
Gaudynska et al.

(10) Patent No.: US 12,504,597 B2
(45) Date of Patent: Dec. 23, 2025

(54) CAM-BASED FORCE-CONTROLLED SYSTEM FOR SEAL ACTIVATION

(71) Applicant: Corning Research & Development Corporation, Corning, NY (US)

(72) Inventors: Marta Eliza Gaudynska, Lodz (PL); Przemyslaw Andrzej Kukian, Łódź (PL); Marcin Kusmierek, Lodz (PL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 507 days.

(21) Appl. No.: 17/957,616

(22) Filed: Sep. 30, 2022

(65) Prior Publication Data

US 2023/0095877 A1 Mar. 30, 2023

Related U.S. Application Data

(60) Provisional application No. 63/250,729, filed on Sep. 30, 2021.

(51) Int. Cl.
*G02B 6/44* (2006.01)
*H02G 15/013* (2006.01)
*H05K 5/02* (2006.01)

(52) U.S. Cl.
CPC ....... *G02B 6/44775* (2023.05); *H02G 15/013* (2013.01); *H05K 5/023* (2013.01)

(58) Field of Classification Search
CPC ... G02B 6/44775; H02G 15/013; H05K 5/023
See application file for complete search history.

(56) References Cited

U.S. PATENT DOCUMENTS

| 9,250,407 | B2* | 2/2016 | Vastmans | G02B 6/4401 |
| 9,343,891 | B2* | 5/2016 | Vanhentenrijk | H02G 15/013 |
| 10,324,263 | B2* | 6/2019 | Bund | G02B 6/3825 |

(Continued)

FOREIGN PATENT DOCUMENTS

| AU | 2012252494 B2 | 7/2016 |
| EP | 2251729 A1 | 11/2010 |

OTHER PUBLICATIONS

European Patent Application No. 22198786.0, Extended European Search Report, dated Feb. 27, 2023; 8 pages; European Patent Office.

*Primary Examiner* — Christine M Mills
*Assistant Examiner* — L. Susmitha Koneru
(74) *Attorney, Agent, or Firm* — Tamika A. Crawl-Bey (57) ABSTRACT

A cam-based, force-controlled system for seal activation includes a plurality of sealing segment assemblies. Each sealing segment assemblies includes an inner segment and an outer segment assembly configured to mate with the inner segment. The inner segment includes an upper segment portion, a lower segment portion, and an inner segment seal disposed between the upper segment portion and the lower segment portion. The outer segment assembly includes an upper segment element, and outer perimeter element, an outer segment seal disposed between the upper segment element and the outer perimeter seal, a rod coupled to the upper segment element, a first cam coupled to the upper segment element, a second cam coupled to the upper segment element, and a handle coupled to the rod, the first cam, and the second cam.

16 Claims, 13 Drawing Sheets

(56) References Cited

U.S. PATENT DOCUMENTS

| | | | |
|---|---|---|---|
| 2011/0052131 A1* | 3/2011 | Park | G02B 6/3888 385/136 |
| 2011/0116748 A1* | 5/2011 | Smrha | G02B 6/3897 385/76 |
| 2011/0268417 A1* | 11/2011 | Quesnel | F16G 11/106 385/137 |
| 2014/0072266 A1* | 3/2014 | Vastmans | H02G 15/013 385/100 |
| 2015/0168664 A1 | 6/2015 | Coenegracht et al. | |
| 2018/0259721 A1* | 9/2018 | Bund | G02B 6/3897 |
| 2021/0072481 A1 | 3/2021 | Wittmeier et al. | |

* cited by examiner

CAM-BASED FORCE-CONTROLLED SYSTEM FOR SEAL ACTIVATION

CROSS-REFERENCE TO RELATED APPLICATIONS

This application claims the benefit of priority under 35 U.S.C. § 119 of U.S. Provisional Application No. 63/250,729, filed Sep. 30, 2021, the content of which is relied upon and incorporated herein by reference in its entirety.

BACKGROUND

The present disclosure generally relates to cam-based, force-controlled systems for seal activation, and particularly for seal activation of seals used in telecommunication closures.

Telecommunication systems include various networks, subsystems and components that allow for the transmission of data and voice signals over long distances. Telecommunication closures (also referred to in the telecommunications industry as enclosures) and telecommunication cables make up part of these networks and subsystems. Telecommunication cables include, but are not limited to fiber optic cables, copper cables, or hybrid cables having a combination of copper and fiber optic cables. Telecommunication closures house and protect components such as splices, termination panels, power splitters and wavelength division multiplexers, which are used in telecommunication systems.

Telecommunication closures are typically sealed to protect components inside of the closure from environmental exposure. For example, telecommunication closures are designed to inhibit the intrusion of moisture, bugs, and other types of contaminants.

While some types of sealing systems for telecommunication closures are effective, there is still a need for improvements in this area, particularly with respect to seal activation.

SUMMARY

Disclosed herein are various embodiments of integrated cable port and perimeter sealing systems, telecommunication closures, and methods of using such sealing systems and closures in telecommunication systems. In comparison to prior art sealing systems used in telecommunication closures, the embodiments disclosed herein provide According to a first aspect of the disclosure, a cam-based, force-controlled system for seal activation of seals in a telecommunication closures includes a plurality of sealing segment assemblies. Each sealing segment assemblies includes an inner segment and an outer segment assembly configured to mate with the inner segment. The inner segment comprises an upper segment portion, a lower segment portion, and an inner segment seal disposed between the upper segment portion and the lower segment portion. The outer segment comprises an upper segment element, and outer perimeter element, an outer segment seal disposed between the upper segment element and the outer perimeter seal, a rod coupled to the upper segment element, a first cam coupled to the upper segment element, a second cam coupled to the upper segment element, and a handle coupled to the rod, the first cam, and the second cam. Upon application of a force to the handle the first cam, the second cam, and the rod, the handle is configured to activate at least one of the plurality of sealing segment assemblies.

Additional aspects, features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Various exemplary embodiments of the disclosure will now be described with particular reference to the drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the features and limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

For the purposes of describing and defining the subject matter of the disclosure it is noted that the terms "substantially" and "generally" may be utilized herein to represent the inherent degree of uncertainty that may be attributed to any quantitative comparison, value, measurement, or other representation.

Figure 1:
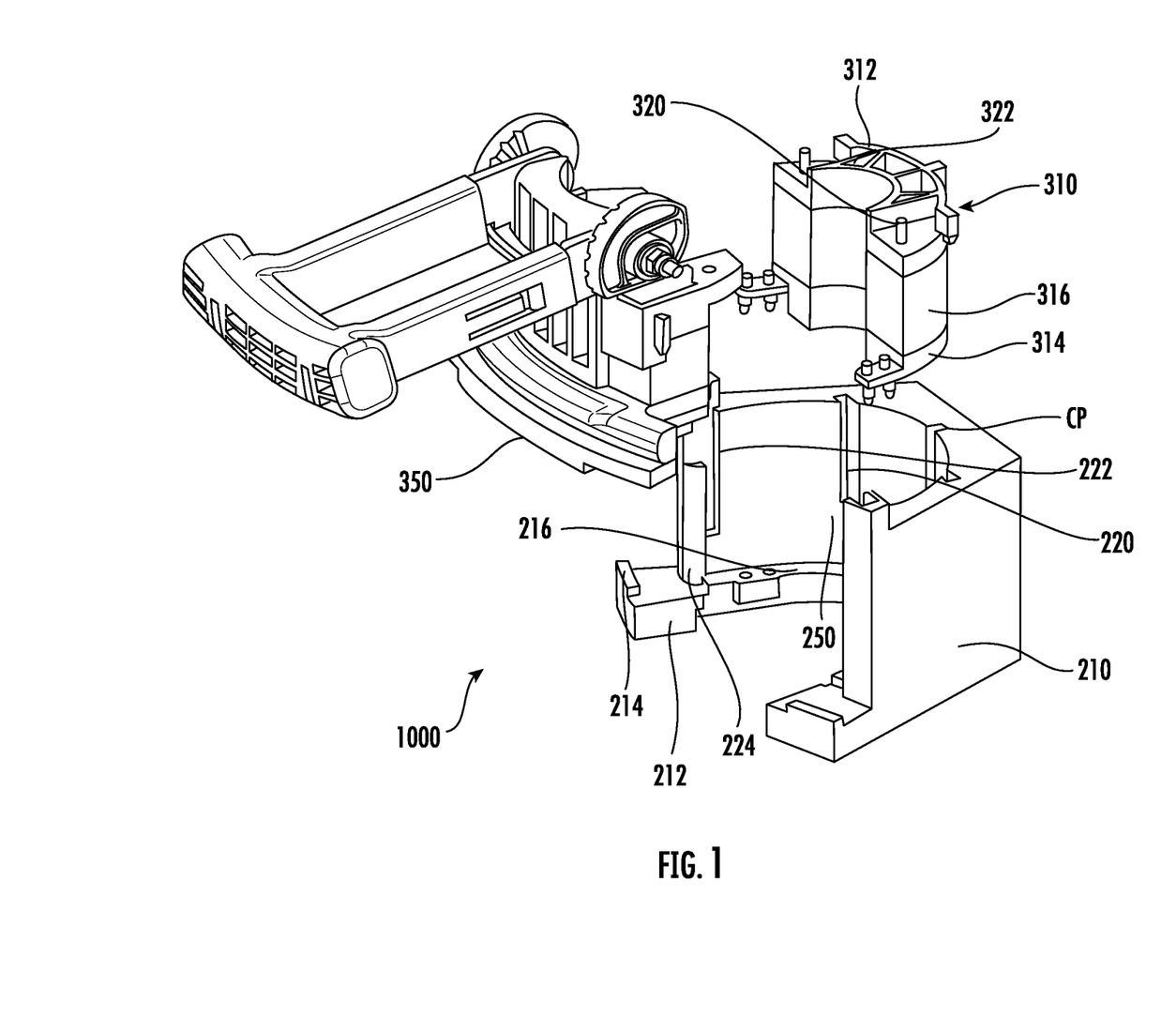
FIG. 1 is a partially exploded isometric view of a cam-based, force-controlled system and a portion of an endcap in accordance with embodiments disclosed herein.
Figure 2:
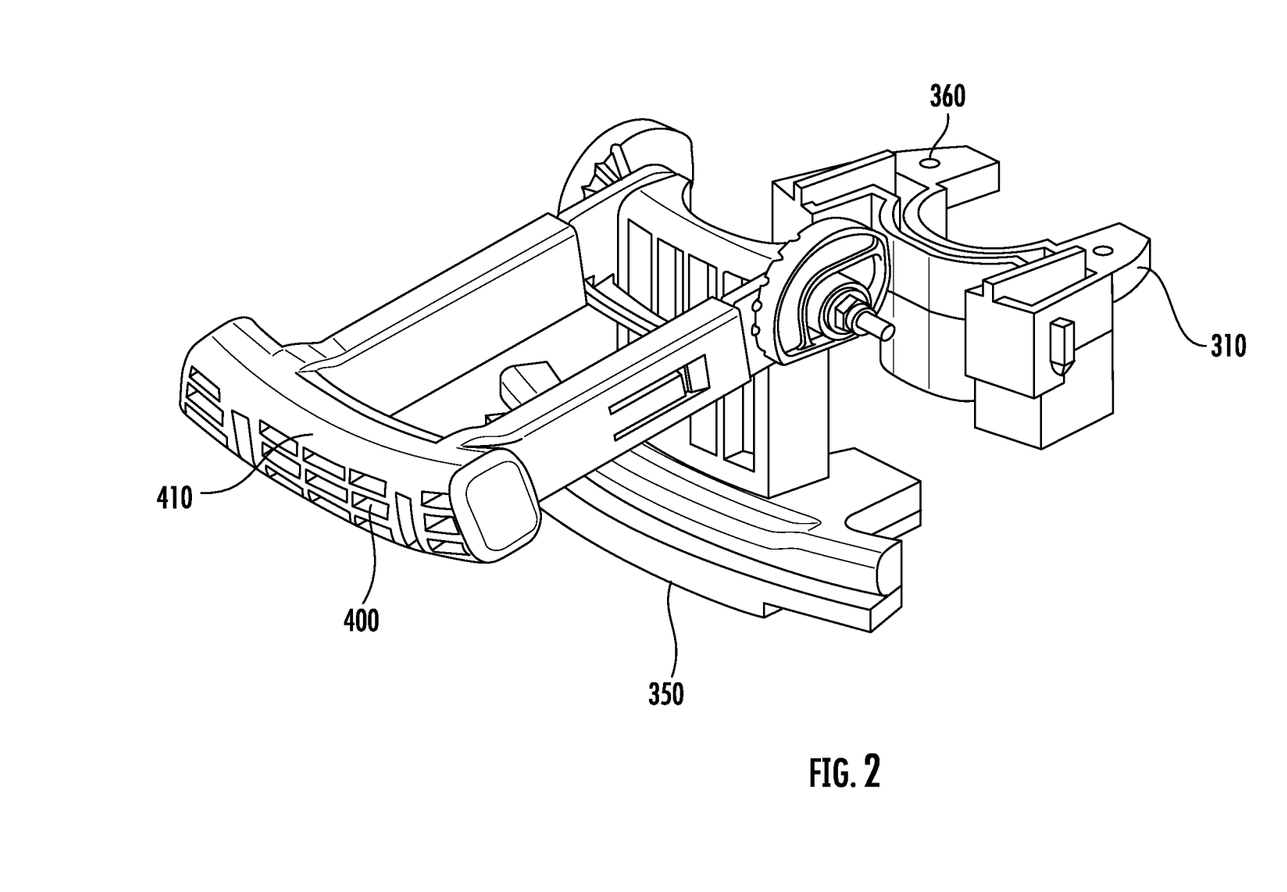
FIG. 2 is a partially exploded isometric view of an outer segment assembly of the cam-based, force-controlled system shown in FIG. 1.

FIGS. 1 and 2 show an exemplary embodiment of a cam-based, force-controlled system 1000 for seal activation, and particularly for seal activation of sealing elements used in telecommunication closures. The system 1000 includes an endcap 200, a sealing segment assembly 300 having an inner segment 310 and an outer segment assembly 350, including a cam-based handle assembly 400 with a handle 410, handle insert 450, cams 500, 550, and a rod 600.

Segmented portions of the endcap 200 are shown and described herein. Such segmented portions can be multiplied and integrated such that a plurality of slotted areas are contained in the endcap. Moreover, the endcap is configured to be mounted to a cover assembly (not shown) included in a telecommunication closure. Preferred telecommunication closures include dome-type closures having a dome-type cover, which extends upwardly and around the endcap to enclose various components contained therein.

Referring particularly to FIG. 1, the endcap 200 includes an endcap body 210 having at least one slotted area 250 disposed therein. In preferred embodiments, the endcap 200 includes eight slotted areas. The number of slotted areas included in the endcap, however, should not be construed as limiting. Fewer or additional slotted areas can be included in the endcap depending upon application requirements, the size or footprint of the closure, manufacturing parameters, etc.

Figure 7A:
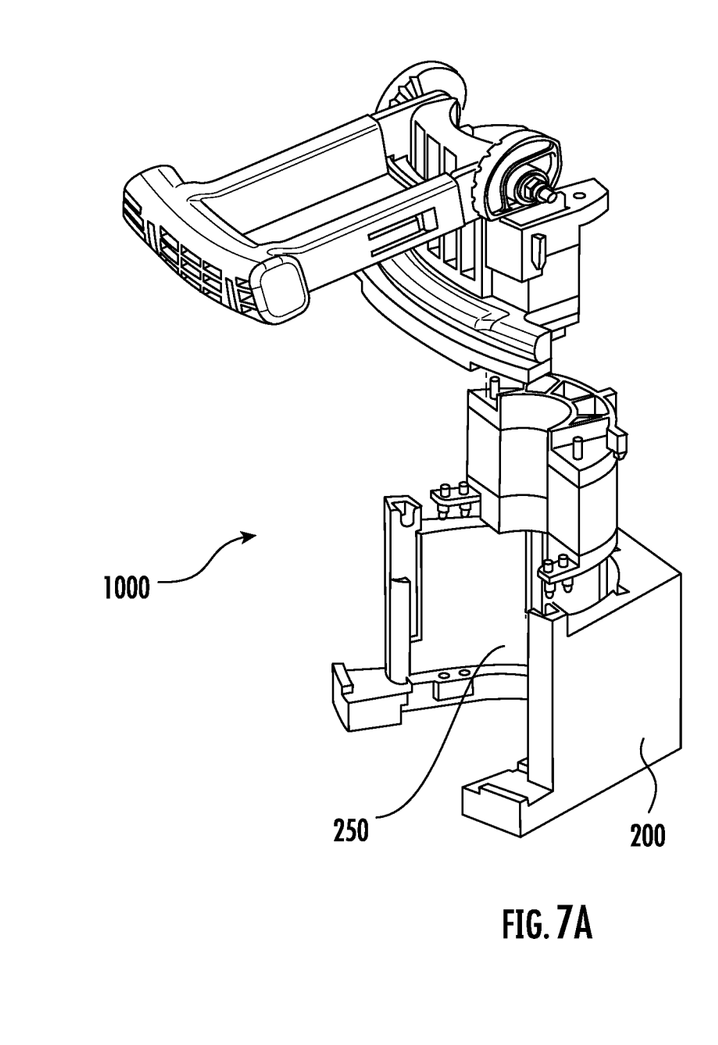
FIGS. 7A and 7B are a partially exploded isometric views of a cam-based, force-controlled system in accordance with embodiments disclosed herein.
Figure 7B:
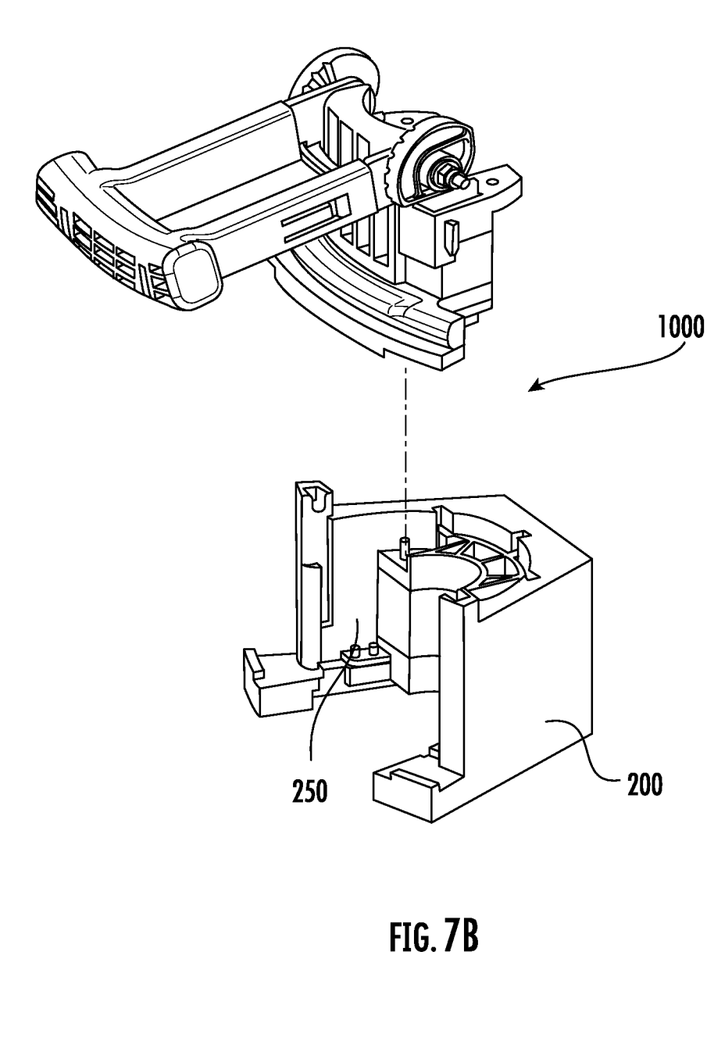
Figure 8:
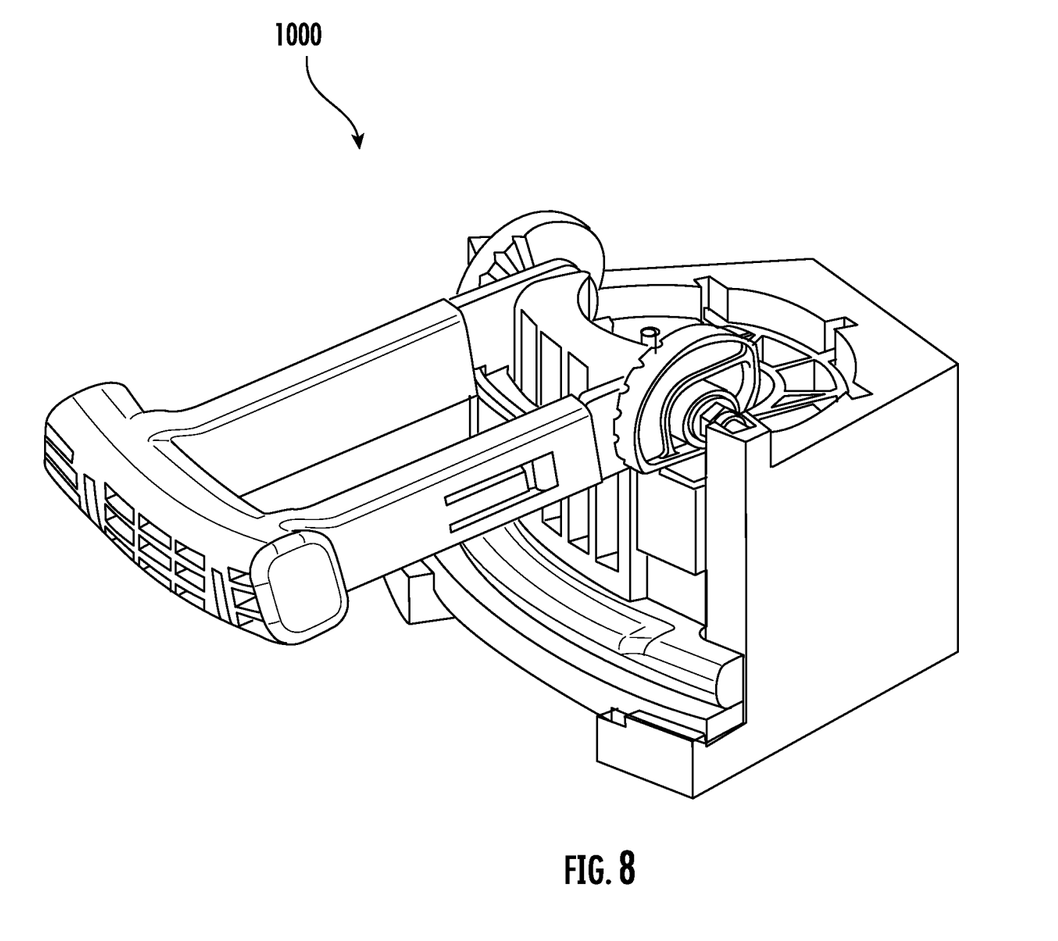
FIG. 8 is an isometric view of an assembled cam-based, force-controlled system in accordance with embodiments disclosed herein.
Figure 9A:
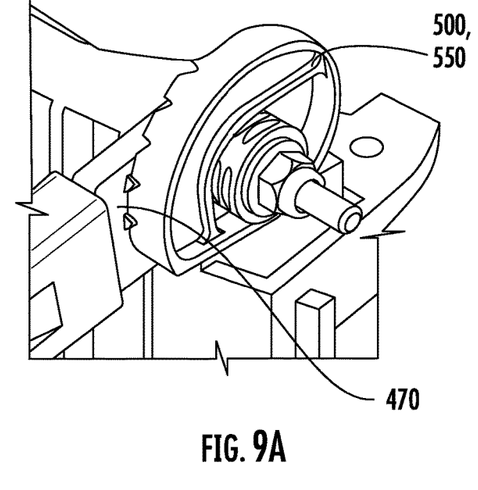
FIGS. 9A-9D are detailed views of components included in the cam-based, force-controlled systems disclosed herein.
Figure 9B:
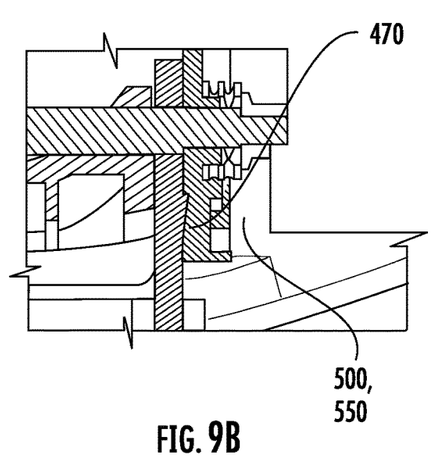
Figure 9C:
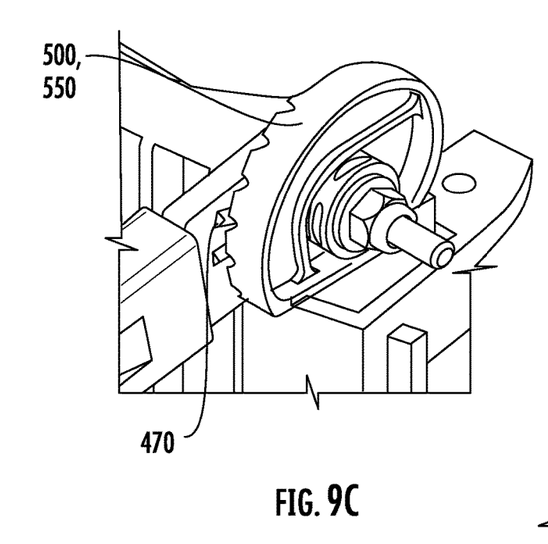
Figure 9D:
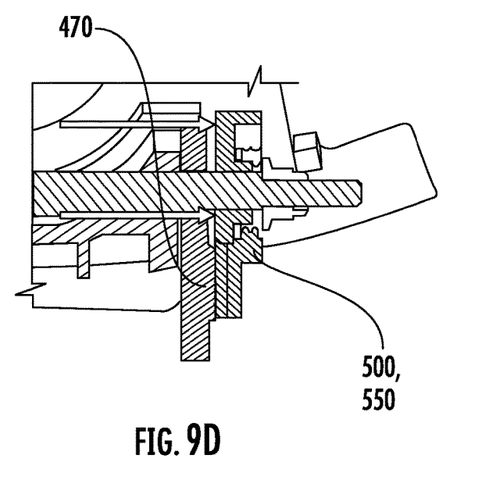
Figure 10A:
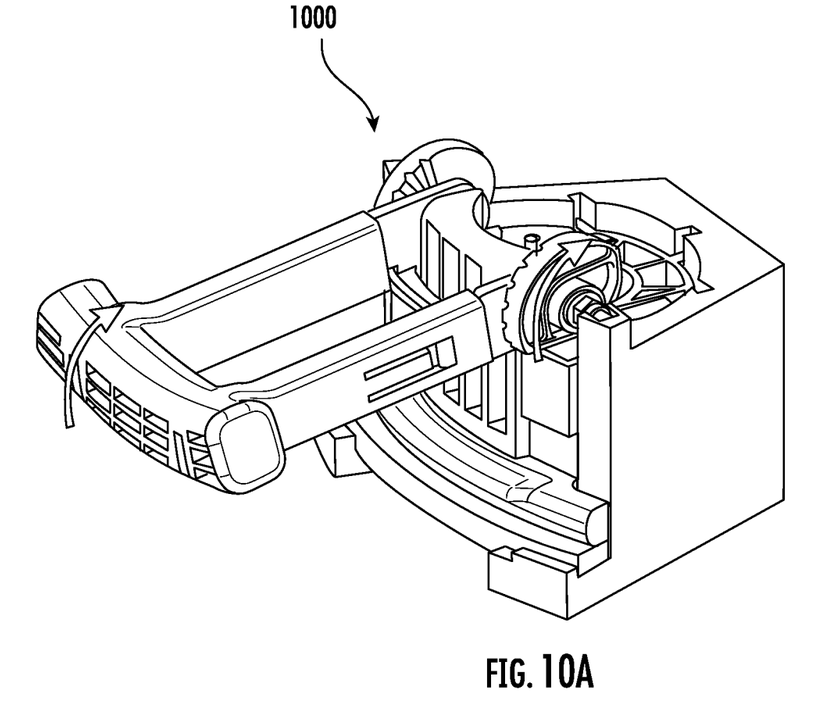
FIG. 10A is an isometric view of a cam-based, force-controlled system for seal activation in accordance with embodiments disclosed herein.
Figure 10B:
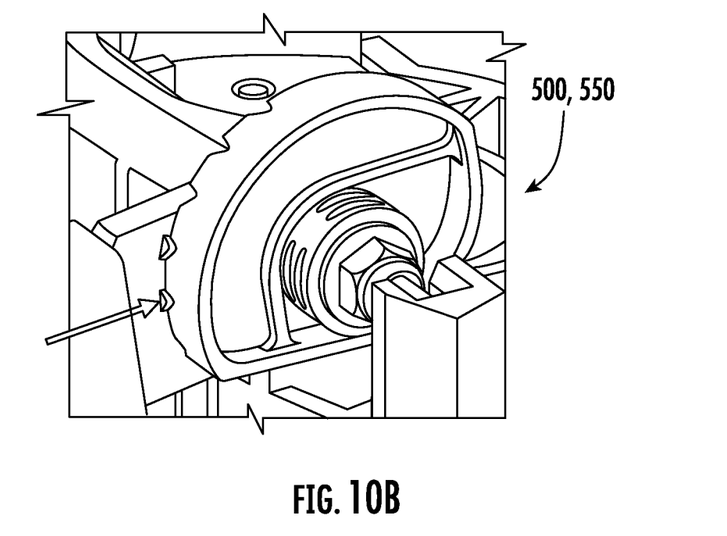
FIG. 10B is a detail view of a section of the cam-based, force-controlled system for seal activation in accordance with embodiments disclosed herein.
Figure 11A:
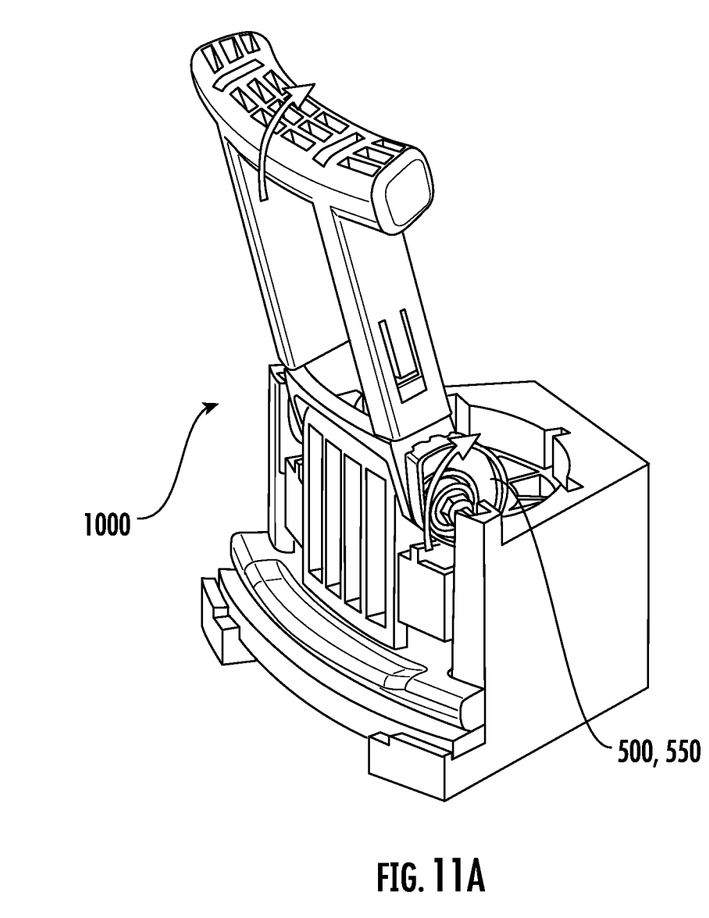
FIG. 11A is an isometric view of a cam-based, force-controlled system for seal activation in accordance with embodiments disclosed herein.
Figure 11B:
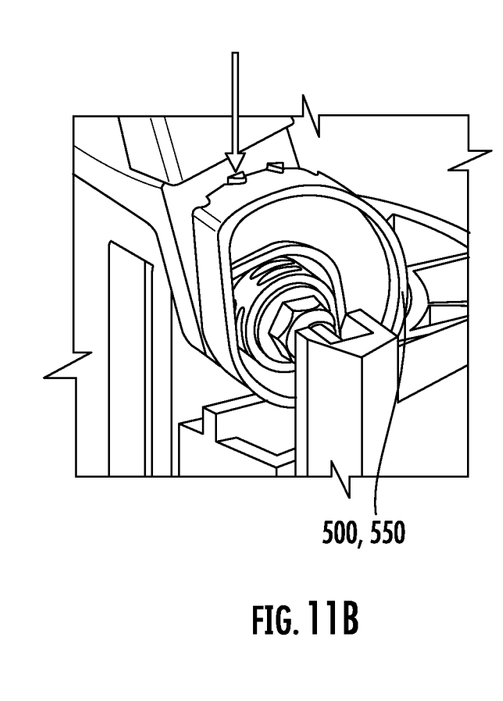
FIG. 11B is a detail view of a section of the cam-based, force-controlled system for seal activation in accordance with embodiments disclosed herein.
Figure 12A:
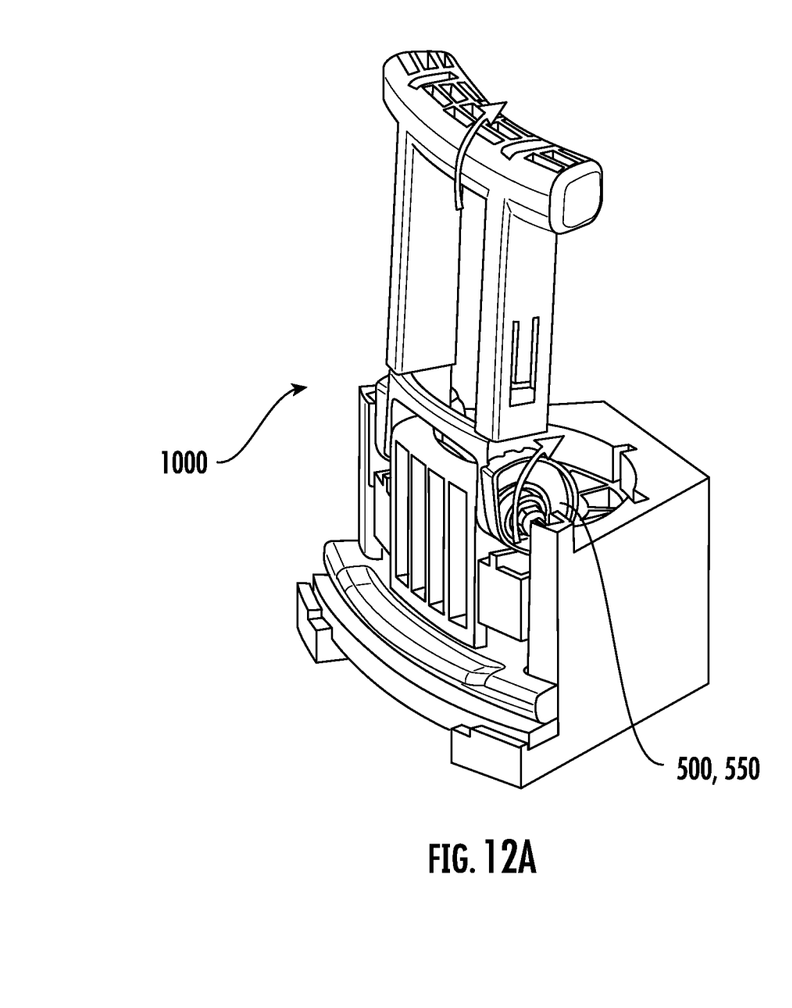
FIG. 12A is an isometric view of a cam-based, force-controlled system for seal activation in accordance with embodiments disclosed herein.
Figure 12B:
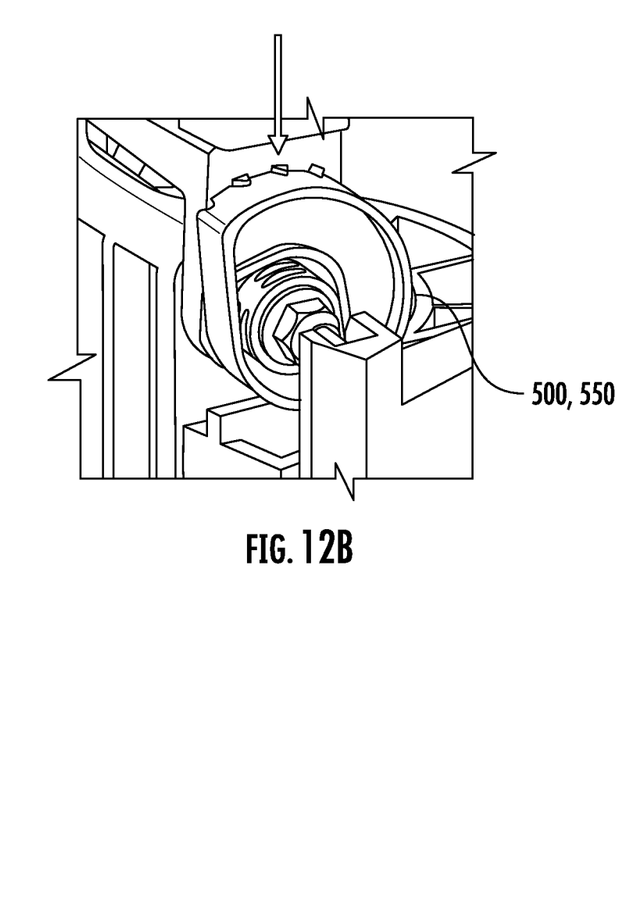
FIG. 12B is a detail view of a section of the cam-based, force-controlled system for seal activation in accordance with embodiments disclosed herein.

FIGS. 1, 7A, and 7B illustrate a portion of the endcap body 210 with additional detail included in each slotted area 250. The endcap body 210 includes an outer endcap rim 212 having an upwardly extending edge 214 and an inner endcap step 216 positioned higher than the outer endcap rim 212. A portion of each slotted area has a curved profile CP, having a semi-circular section. A plurality of elongated notches 220, 222 is positioned at intervals along the inner surface of each slotted area 250. At least some of the notches are preferably configured to engage with complimentary surfaces of each respective sealing segment assembly 300. Extending from end faces 218 of the endcap are tangs 224, which facilitate alignment and connection of the sealing segment assembly 300 into the slotted area 250.

Each inner segment 310 includes an upper segment portion 312, a lower segment portion 314, and an inner segment seal 316 disposed between the upper segment portion 312 and the lower segment portion 314. Each upper segment portion 312, lower segment portion 314, and inner segment seal 316 has an arc shape and substantially flat forward-facing surfaces that allow for substantially flush mating of the inner segment 310 with the outer segment assembly 350. The upper segment portion 312 and the lower segment portion 314 also include a plurality of protruding mating elements 320, 322 configured for insertion into the upper segment element 352 of the outer segment assembly 350.

Still referring particularly to FIG. 1, each outer segment assembly 350 has an upper segment element 352, an outer perimeter element 354, and an outer segment seal 356 disposed between the upper segment element 352 and the outer perimeter element 354. Each upper segment element 352, outer perimeter element 354, and outer segment seal 356 has an arc shape and substantially flat forward-facing surfaces that allow for mating of the inner segment 310 with the outer segment assembly 350. The upper segment element 352 and the outer perimeter element 354 also include a plurality of openings 360 configured to receive the protruding mating elements 320, 322 of the inner segment 310. The upper segment element 352 also includes protruding mating elements 364 configured for positioning within the elongated slots of the endcap 200.

Upon assembly, the inner segment 310 and the outer segment assembly 350 are configured to provide sealing segment assemblies, which each act as a sealed cable port, allowing at least one cable to pass through in a sealed state. FIGS. 7A and 7B illustrate how the sealing segment assemblies 300 are assembled into the endcap 200. FIGS. 10A-

12B show the system 100 in various stages from an initial position to activated positions, with the progression of the positioning being schematically represented by arrows. Controlled forces are applied to the sealing segment assembly to compress the sealing elements contained therein and move the sealing segment assembly downward to an activated state.

Figure 3:
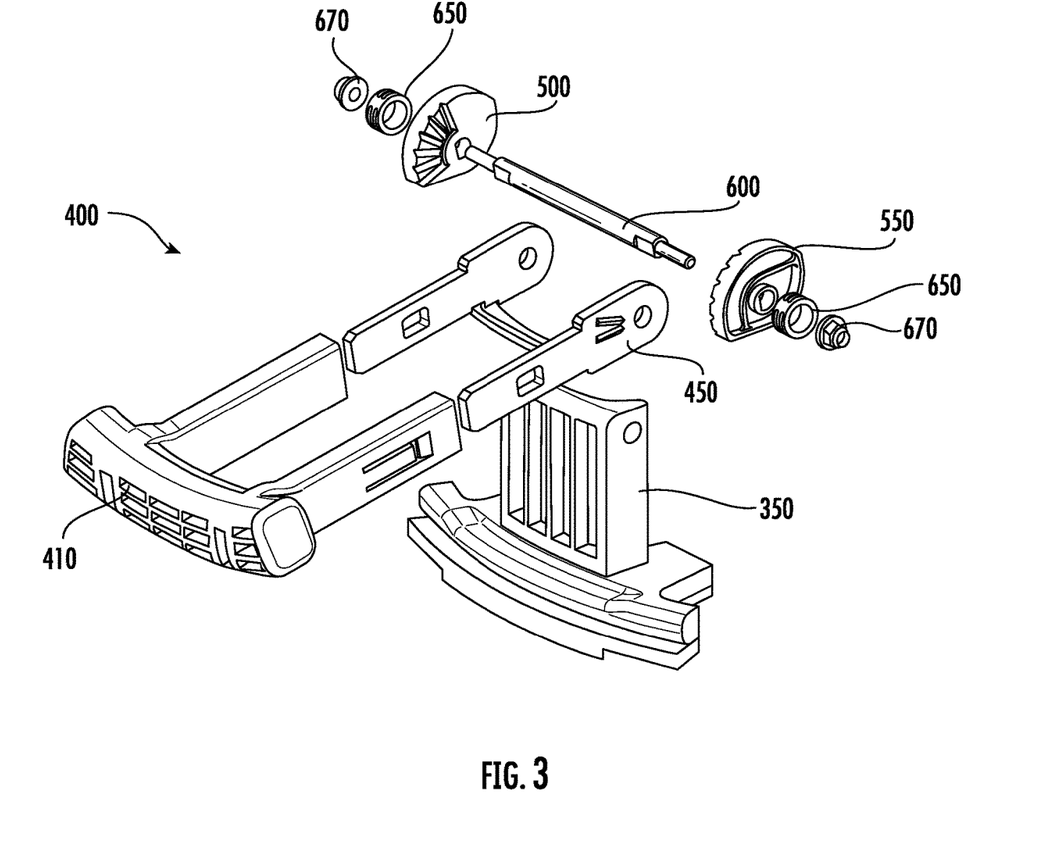
FIG. 3 is an exploded isometric view of the outer segment assembly shown in FIG. 2.

FIG. 3 is an exploded view, showing all the elements included in the outer segment assembly 350. The outer segment assembly 350 includes the cam-based handle assembly 400, the handle 410, the handle insert 450, cams 500, 550, a rod 600, nut-washer 650, and springs 670.

Figure 4:
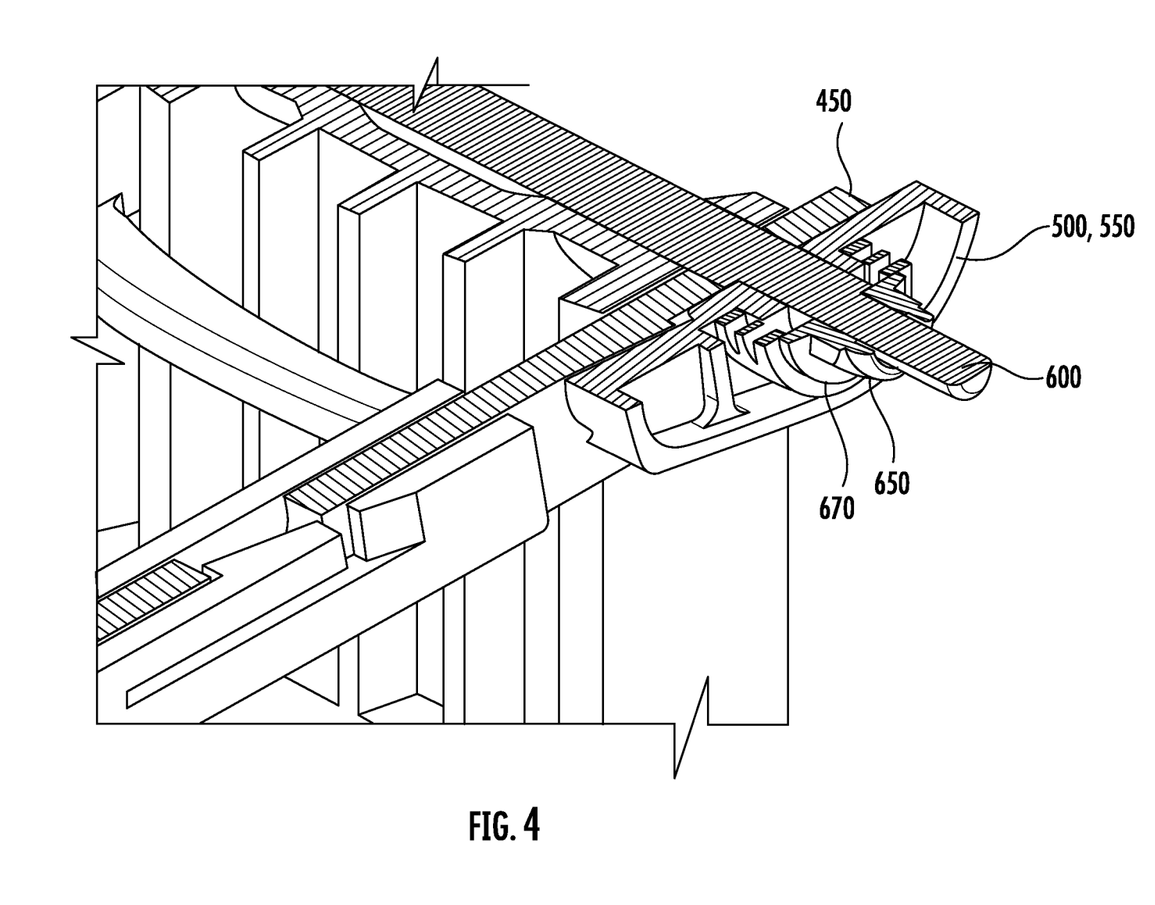
FIG. 4 is detail cross-sectional view of a portion of the outer segment assembly shown in FIG. 3.
Figure 5A:
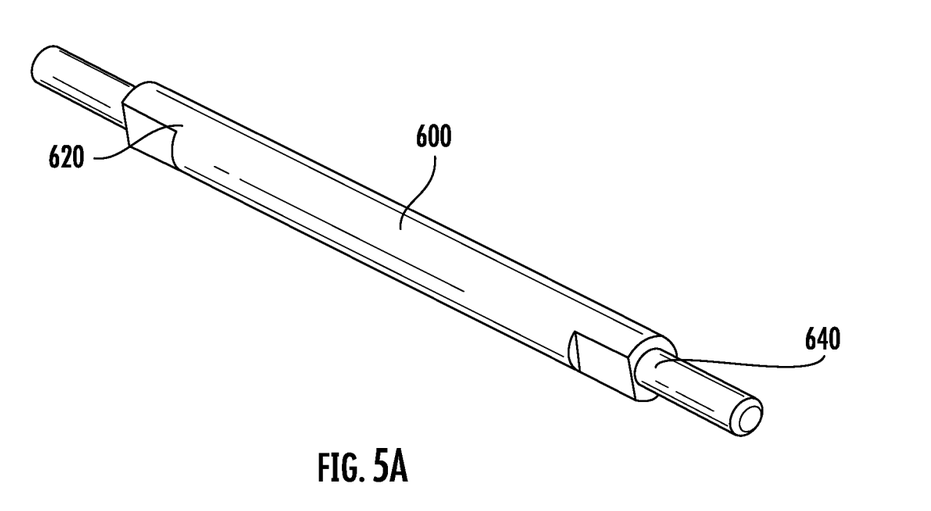
FIG. 5A is an isometric view of a rod included in the outer segment assembly shown in FIG. 3.
Figure 5B:
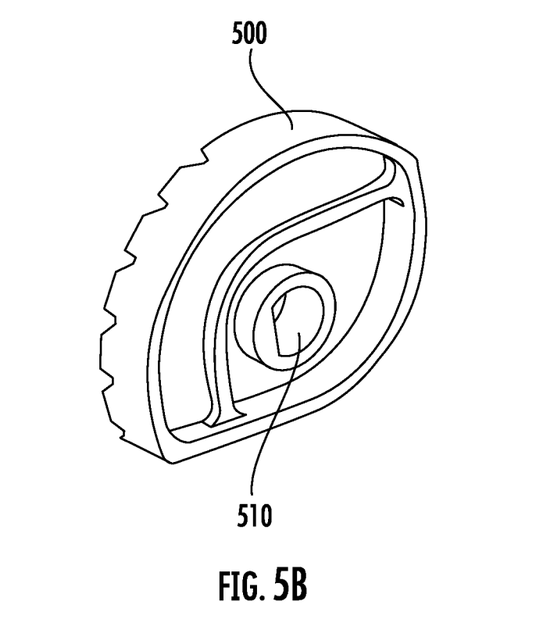
FIGS. 5B and 5C are isometric views of cams included in the outer segment assembly shown in FIG. 3.
Figure 5C:
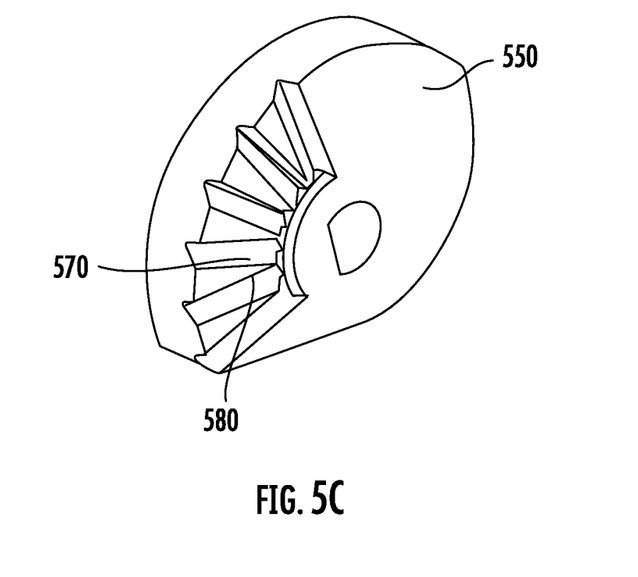

FIG. 4 illustrates in a cross-sectional view features of the cams 500, 550, a rod 600, nut-washer 650, and springs 670. FIG. 5A provides additional detail of the rod 600, including stepped areas 620, 640. FIGS. 5A, 5B, and 5C show additional detail with respect to cams 500, 550 are particularly cam hubs 510, 570 and the cut-out portions 580.

Figure 6:
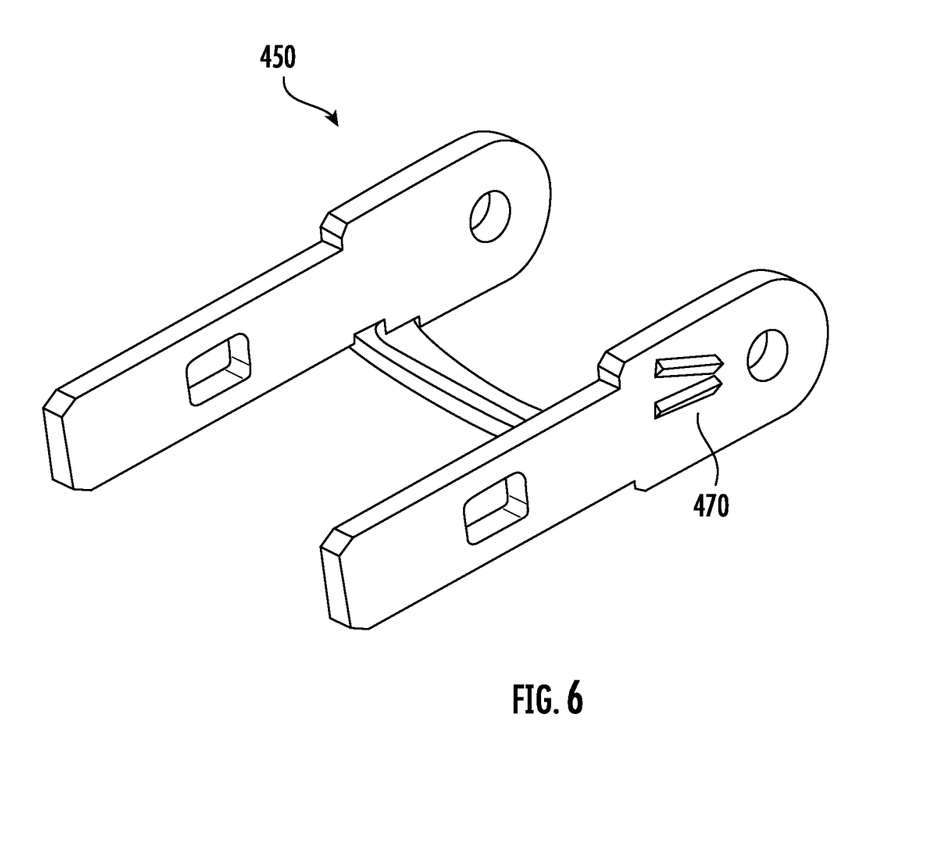
FIG. 6 is an isometric view of a handle included in the outer segment assembly shown in FIG. 3.

FIG. 6 provides additional detail with respect to the handle insert 450, highlighting position ribs 470 that allow for adjustment of the cams 500, 550 in concert with the cut-out portions of the cam hubs, as shown particularly in FIGS. 9A-9D. FIGS. 7A-12B illustrate the system in various stages of release and activation. During activation cut-out portions 580 of the cams 500, 550 and positioning ribs are configured to create a ratcheting or clutching action.

In embodiments, the sealing elements shown and described herein may be manufacturing from one or materials having a Shore 000 hardness in the range of 20-80 or 30-60. The one or materials may have a compression set less than or equal to 10 percent, less than or equal to 15 percent, or less than or equal to 20 percent. Any material that meets these Shore 000 hardness and compression set requirements can be used.

In embodiments, the sealing elements are manufactured from a composition that includes a dry silicone gel or a polyurethane gel. As used herein, the term "dry silicone gel" may refer to a chemically crosslinked polymer having a Si—O backbone and comprising a relatively low amount, or no amount at all, of diluent fluids such as silicone oil or mineral oil. As opposed to carbon-based polymers, the crosslinked silicone polymers of dry silicone gels are based on a Si—O backbone. The characteristics of silicon and oxygen provide crosslinked polymers with their exceptional properties. For example, silicon forms stable tetrahedral structures, and silicon-oxygen bonds are relatively strong which results in dry silicone gels with high temperature resistance. In addition, crosslinked Si—O polymers have a relatively high chain flexibility as well as low rotational energy barrier.

The dry silicone gels may be made according to a number of different polymerization reactions. In certain embodiments, the polymerization reaction is a hydrosilylation reaction, also referred to as a hydrosilation reaction. In some embodiments, the hydrosilylation reaction makes use of a platinum catalyst, while other embodiments make use of radicals. In further embodiments, the dry silicone gel is made by a dehydrogenated coupling reaction. In other embodiments, the dry silicone gel is made by a condensation cure RTV reaction.

In certain embodiments, the dry silicone gel is made by reacting at least a crosslinker, a chain extender, and a base polymer (e.g., a vinyl-terminated polydimethylsiloxane). In certain embodiments, a catalyst is included to speed up the reaction. In additional embodiments, an inhibitor may be used to slow down the rate of reaction.

Polyurethane gels are typically formed from the reaction of a polyfunctional organic isocyanate with a polyfunctional isocyanate reactive material in the presence of a non-volatile inert liquid. The polyurethane component of the gel is typically crosslinked (thermoset) and the isocyanate reactive material contributes to flexibility. The loading of the non-volatile inert liquid in polyurethane gels is typically quite high. It is almost always higher than 10% by weight of the total gel composition, and is typically higher than 30% by weight of the total gel composition. Plasticizer loadings of greater than 50% of the total composition are well known. Plasticizers (typically inert, non-volatile liquids) that have been used in the past in preparing polyurethane gels include phthalate plasticizers (such as DIOP), vegetable oils, mineral oils, liquid resins such as polybutene resins, other kinds of ether and ester containing liquids, mixtures of these, and the like. [0119] For example, polyurethane gel can be made by gelling a mixture comprising conventional curable polyurethane precursor materials in the presence of substantial quantities of a mineral or vegetable oil or a mixtures thereof (e.g., in an amount of 60 to 80%) or a suitable plasticizer, e.g., a trimellitate such as n-octyl-n-decyl trimellitate (e.g., in an amount of 30 to 70%).

In some embodiments, the sealing element material(s) (e.g., a dry silicone gel or a polyurethane gel) has/have a hardness in the range of 20 to 80 Shore 000. In some embodiments, the sealing element material(s) (e.g., a dry silicone gel or a polyurethane gel) has/have a hardness in the range of 30 to 60 Shore 000. In other embodiments, the sealing element material(s) (e.g., a dry silicone gel or a polyurethane gel) has/have a hardness in the range of 37 to 45 Shore 000. In yet other embodiments, the cable sealing insert material (e.g., a dry silicone gel or a polyurethane gel) has a hardness in the range of 38 to 42 Shore 000. Shore 000 hardness referenced herein is residual hardness measured according to ASTM D2240 with a 30 second hold time.

In some embodiments, the cable sealing insert material (e.g., a dry silicone gel or a polyurethane gel) is compressed to about 50% of its original height. This causes a certain stress in the material. The stress is now reduced because the material relaxes. In certain embodiments, the stress relaxation of the cable sealing insert material is 20% to 70% when subjected to compression to about 50% of the original height of the material at 85° C., wherein the stress relaxation is measured after a one minute hold time. In certain embodiments, the stress relaxation of the cable sealing insert material is 30 to 60% when subjected to compression to about 50% of the original height of the material at 85° C., wherein the stress relaxation is measured after a one minute hold time. In other embodiments, the stress relaxation of the cable sealing insert material is 40% to 60% when subjected to compression to about 50% of the original height of the material at 85° C., wherein the stress relaxation is measured after a one minute hold time. A higher stress relaxation indicates that once a cable sealing insert material is installed in an enclosure, the cable sealing insert material will require less stress in order for it to seal.

Sealing materials (i.e., gel materials) that may be used for cable ports in accordance with the present disclosure can have certain material properties adapted to facilitate cable size range taking and reliable sealing in systems that optionally may not include a separate actuator for pressurizing the seal and for maintaining pressure on the sea lower extended times. For example, exemplary sealant materials can be defined by properties such as hardness, compression set, resistance to extrusion, elongation to failure, and oil bleed out properties.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A cam-based, force-controlled system for seal activation, comprising:
    a plurality of sealing segment assemblies, wherein each of the plurality of sealing segment assemblies comprises an inner segment and an outer segment assembly configured to mate with the inner segment;
    wherein the inner segment comprises an upper segment portion, a lower segment portion, and an inner segment seal disposed between the upper segment portion and the lower segment portion; and
    wherein the outer segment assembly comprises an upper segment element, and outer perimeter element, an outer segment seal disposed between the upper segment element and the outer perimeter seal, a rod coupled to the upper segment element, a first cam coupled to the upper segment element, a second cam coupled to the upper segment element, and a handle coupled to the rod, the first cam, and the second cam, wherein upon application of a force to the handle, the first cam, the second cam, and the rod are configured to activate at least one of the plurality of sealing segment assemblies.

2. The system of claim 1, further comprising an endcap having at least one slotted area configured to receive the mated inner segment and outer segment assembly.

3. The system of claim 2, wherein the endcap is mountable to a cover of a telecommunication closure.

4. The system of claim 2, wherein the endcap comprises an endcap body having an outer endcap rim with an upwardly extending edge and an inner endcap step positioned above the outer endcap rim.

5. The system of claim 2, wherein each slotted area has a curved profile that includes a semi-circular section.

6. The system of claim 2, wherein the endcap comprises a plurality of elongated notches positioned at intervals along an inner surface of each slotted area.

7. The system of claim 6, wherein at least some of the elongated notches are configured to engage with complimentary surfaces of each respective sealing segment assembly.

8. The system of claim 7, wherein the endcap comprises end faces and wherein a tang extends from at least one of the end faces.

9. The system of claim 8, wherein the tang is configured to align and connect the sealing segment assembly with the slotted area of the endcap.

10. The system of claim 2, wherein the system further comprises a handle insert positionable within the handle.

11. The system of claim 10, wherein the handle insert comprises at least two positioning ribs.

12. The system of claim 11, wherein the handle insert comprises at least four positioning ribs.

13. The system of claim 12, wherein two of the at least four positioning ribs couple with the first cam.

14. The system of claim 12, wherein two of the at least four positioning ribs couple with the second cam.

15. The system of claim 13, wherein the first cam comprises cut-out portions and wherein the at least two positioning ribs are positionable in at least some of the cut-out portions.

16. The system of claim 15, wherein the cut-out portions and the at least two positioning ribs create a ratcheting action.

* * * * *